United States Patent [19]

Chelin

[11] 4,417,769

[45] Nov. 29, 1983

[54] SELF ADJUSTING BEARING ARRANGEMENT

[75] Inventor: Charles R. Chelin, Mentor, Ohio

[73] Assignee: Towmotor Corporation, Mentor, Ohio

[21] Appl. No.: 375,115

[22] PCT Filed: Mar. 29, 1982

[86] PCT No.: PCT/US82/00380

§ 371 Date: Mar. 29, 1982

§ 102(e) Date: Mar. 29, 1982

[51] Int. Cl.³ ............................................. F16C 29/04
[52] U.S. Cl. .................................. 308/3 R; 308/3 B; 187/95
[58] Field of Search .............. 308/3 R, 3 A, 3 B, 3 C, 308/6 R, 244, 3.6; 187/9 E, 95; 212/267; 188/201

[56] References Cited

U.S. PATENT DOCUMENTS

| 131,897 | 10/1872 | Otis | 308/3 B |
|---|---|---|---|
| 1,916,365 | 7/1933 | Dunlop | 308/3 B X |
| 2,772,596 | 12/1956 | Trussell | 308/244 X |
| 3,425,516 | 2/1969 | Minejiro et al. | 187/95 |
| 3,554,327 | 1/1971 | Takamura | 187/95 |
| 4,047,597 | 9/1977 | Okura et al. | 308/3 B X |
| 4,056,170 | 11/1977 | Chelin | 187/95 |

Primary Examiner—Stuart S. Levy
Assistant Examiner—Thomas R. Hannon
Attorney, Agent, or Firm—Alan J. Hickman

[57] ABSTRACT

This invention relates to a self adjusting bearing arrangement (10) for a pair of relatively movably members (12) which eliminates the problems of manual adjustment, improper adjustment, premature bearing failure and inefficient operation of the relatively movable members (12). The self adjusting bearing arrangement (10) has a bearing (17) slidably guided by a support assembly (28) connected to the first member (18) and a thrust member (32) movable relative to the bearing (17) for applying a predetermined force to the bearing (17) and moving the bearing (17) from a first position at which the bearing (17) is spaced from contact with the second member 20 and a second position at which the bearing (17) is in contact with the second member (20) and for maintaining the bearing (17) at the second position. Thus, the self adjusting bearing arrangement eliminates the problems of manual adjustment, improve adjustment, premature bearing failure and inefficient operation of the relatively movable members (12). The self adjusting bearing arrangement is particularly useful in a lift mast assembly.

13 Claims, 2 Drawing Figures

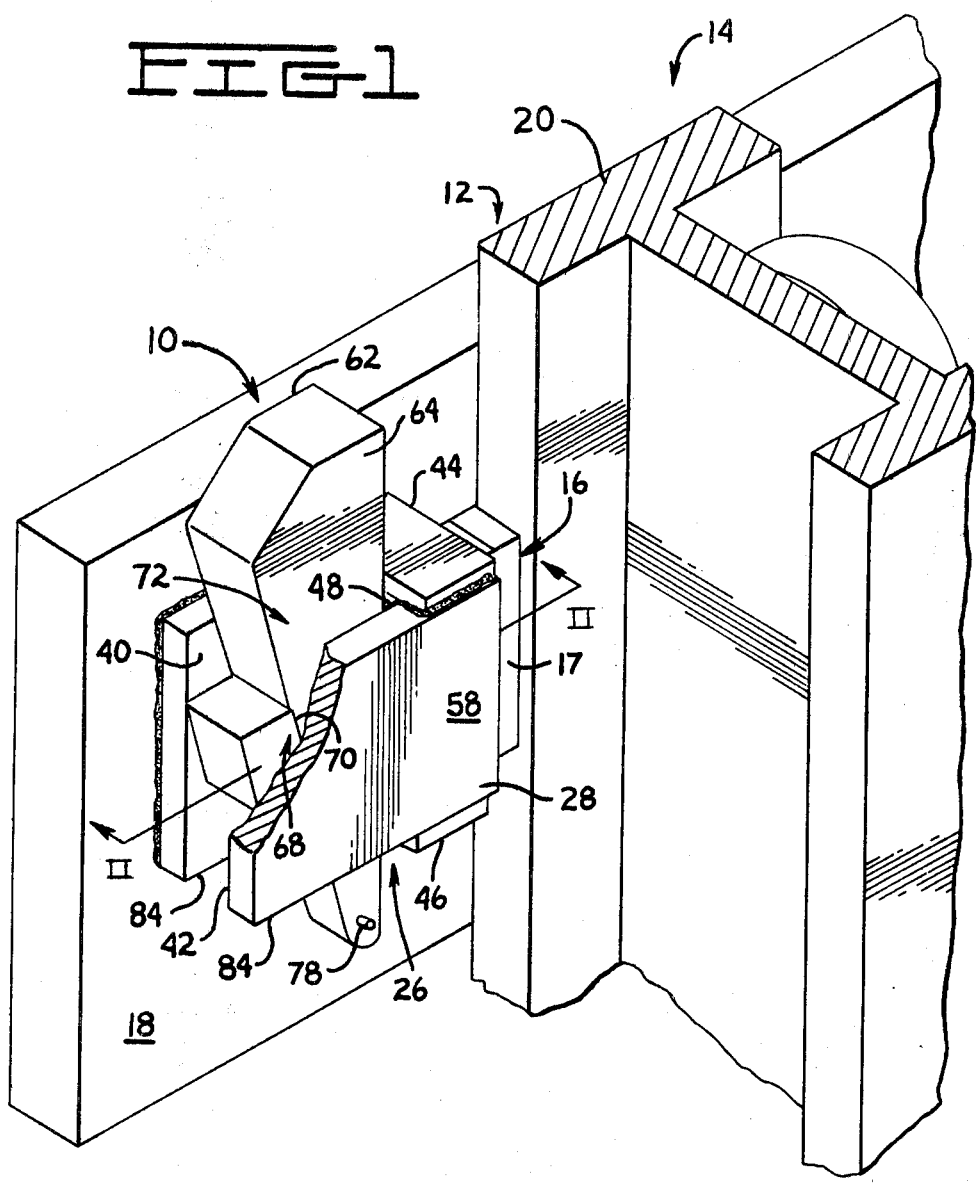

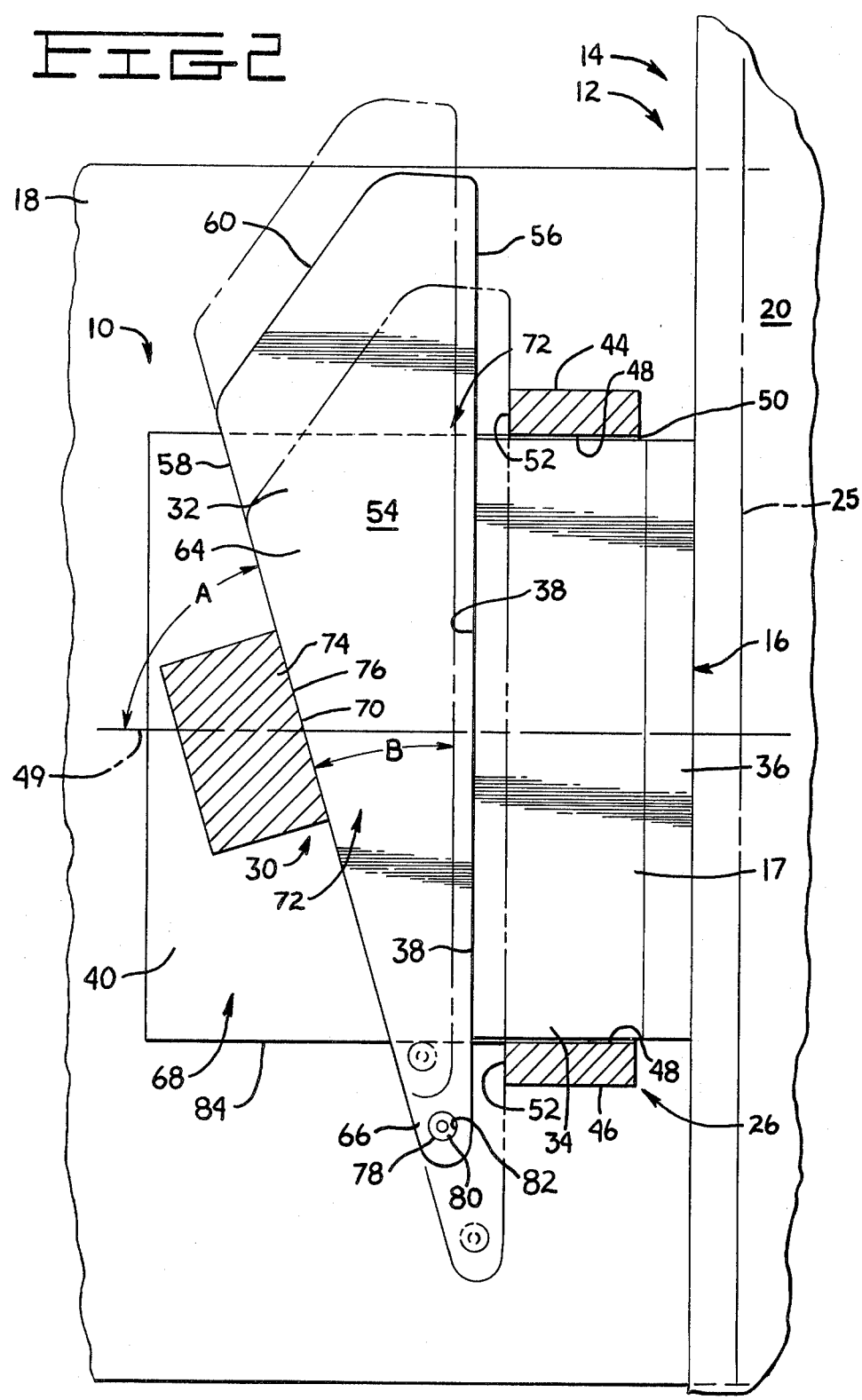

SELF ADJUSTING BEARING ARRANGEMENT

DESCRIPTION

1. Technical Field

This invention relates to a self adjusting bearing arrangement for a pair of relatively movable members and more particularly to a self adjusting bearing arrangement for a lift mast assembly having a bearing for guiding a first member of the lift mast for movement relative to a second member of the lift mast, a support assembly movable connecting the bearing to the first member and an adjustment device for automatically applying predetermined force to the bearing to move the bearing, in response to movement thereof, into contact with the second member, and for maintaining the bearing in contact with the second member.

2. Background Art

Bearing arrangements provided for guiding one member for movement relative to another member, for example such as used in lift mast assembly, usually consist of either rollers, wear strips, blocks or a combination thereof. In a lift mast these bearing arrangements are normally used as fore-aft load bearings or side thrust load bearings which maintains proper relationships between the associated members guided thereby and provides relatively smooth operation thereof.

Typically these bearing arrangements are subjected to extensive cyclical operation and abuse which results in wear not only of the bearing arrangements themselves but the associated members also. This wear usually results in improper fit up between the members being guided which is reflected by excessive play therebetween. If not corrected the efficiency of operation diminishes drastically which is observed as binding, noise and often failure of the bearings result.

To correct this problem the bearing arrangements often include a provision for adjustment, such as by manually shimming, or manually rotating an eccentric shaft upon which the bearing is mounted. U.S. Pat. No. 3,999,675 dated Dec. 28, 1976 to Forry et al. and U.S. Pat. No. 4,060,151 dated Nov. 29, 1977 to Chelin et al. each show an adjustable side thrust bearing for a lift mast assembly in which shims are added to or deleted therefrom for adjustment purposes. U.S. Pat. No. 4,019,786 dated Apr. 26, 1977 to Yarris teaches a side thrust roller assembly for a lift mast wherein the roller is adjustable through rotation of an eccentric roller shaft. Although these patents provide a solution to correct the adjustment problem the actual use thereof by the mechanic or operator is questionable.

Usually, the mechanic or operators thereof do not maintain proper adjustment until absolutely necessary thereby giving way to unnecessary wear and inefficient operation of the apparatus. Further, adjustment of manually adjustable bearing arrangements requires substantial time and are often improperly adjusted, either too tight or too loose. This serves to promote premature wear of the bearings, flaking or galling of the associated members against which the bearings bear and potential failure thereof.

The present invention is directed to overcoming one or more of the problems as set forth above.

DISCLOSURE OF THE INVENTION

In one aspect of an embodiment of the present invention, a self adjusting bearing arrangement for a pair of relatively movable members is provided. The self adjusting bearing arrangement has a bearing for guiding a first member of the pair for movement relative to a second member of the pair, a support assembly for connecting the bearing to the first member and guiding the bearing for movement between a first position at which the bearing is spaced from contact with the second member and a second position at which the bearing is contactable with the second member, and an adjustment apparatus for applying a predetermined force to the bearing and move the bearing to the second position and maintain the bearing at the second position.

BRIEF DESCRIPTION OF THE DRAWINGS

FIG. 1 is a diagrammatic isometric view of a self adjusting bearing assembly and associated relatively movable members; and FIG. 2 is a diagrammatic side sectional view taken along lines II—II of FIG. 1 showing a bearing and thrust member in solid lines at a second position wherein the bearing is contactably engaged with a second of the movable members and in phantom lines to show movement of the thrust member and bearing between a first position and a position at which the thrust member is restrained from moving the bearing.

BEST MODE FOR CARRYING OUT THE INVENTION

A self adjusting bearing arrangement 10 for a pair of adjacent relatively movable members 12, of a lift mast assembly 14 is shown in the drawings. The bearing arrangement 10 has a bearing means 16, such as a guide bearing 17, for guiding a first member 18 of the pair for movement relative to a second member 20 of the pair. The first member 18 is preferably a lift mast carriage mounted on the second member 20 which is preferably a lift mast elongate upright having a longitudinal upright axis 25.

A carrier means 26 such as a support assembly 28 connects the bearing 17 to the first member 18 and guides the bearing 17 for movement on the support assembly between a first position at which the bearing is spaced from contact with the second member 20 and a second position at which the bearing is contactably engaged with the second member 20.

An adjustment means 30, which includes a thrust member 32 is provided for automatically applying a predetermined force to the bearing 17 which moves the bearing 17 to the second position. The adjustment means 30 in addition to moving the bearing to the second position also maintains the bearing in contact with the second member 20 even when the reaction force applied to the bearing by the upright is greater than the predetermined force required to move the bearing 17 to the second position.

The bearing 17 has a guide portion 34 and a bearing portion 36 connected to the guide portion. The guide portion 34 is preferably rectangular in cross section and constructed of either a suitable metallic or non-metallic material. The bearing portion 36 similarly is preferably rectangular in cross section and constructed of preferably a ultra high molecular weight, fiber reinforced plastic or its equivalent. It is to be noted that other shapes for the guide portion and bearing portion are suitable substitutes. Also replacement of the preferred described bearing portion with either a roller, anti-friction bearing or an equivalent thereof are to be considered encompassed substitutes. The guide portion 34 has a load surface portion 38 at an end thereon opposite the bearing portion 36. The significance of this will be explained in further discussion.

The support assembly 28 has first 40 and second 42 parallel spaced apart sides and third 44 and forth 46 parallel spaced apart sides connected to said first and second sides and defining a bearing support passage 48 therebetween and a longitudinal passage axis 49 therein.

These sides 40,42,44,46 are rectangular in shape and the third 44 and fourth 46 sides are smaller in dimensions than the first 40 and second 42 sides. Although the bearing support passage 48 is rectangular in shape other shapes should be recognized as suitable equivalents thereof. All four sides 40,42,44,46 are aligned at a first end 50 thereof and the opposite second end 52 of the third 44 and fourth 46 sides terminates in length prior to termination in length of the first 40 and second 42 sides. The support assembly 28 is securely connected to the first member 18, such as by welding with the longitudinal passage axis 49 being substantially normal to the longitudinal upright axis 25 of the second member 20 with the first end 50 being closest to said second member 20.

The bearing guide portion 34 is slidably disposed in the support passage 48 with the bearing portion 36 extending past the first end 50 of said support assembly and the end surface portion 38 extending past the second end 52 of the support assembly. Since both the bearing guide portion 34 and the bearing support passage 48 each have the same shape and are relatively close in size the guide bearing is only free to translate along the longitudinal passage axis 49. Any other motion such rotary and the like is prevented.

The thrust member 32 consists of a triangular shaped wedge 54 having first 56, second 58 and third 60 sides, first 62 and second 64 opposed surfaces, and a lower end portion 66. The wedge 54 is mounted on the first member 18 at a location adjacent the end surface portion 38 of the guide bearing 17. Specifically, the wedge 54 is movably supported on a wedge guide portion 68 of the carrier means 26. The wedge guide portion 68 includes the first 40 and second 42 parallel spaced apart sides of the support assembly 28, a third thrust side 70 interconnecting the first and second sides 40 and 42, and the second end 52 of the third 44 and fourth 46 sides of the support assembly 28. The third thrust side 70 is spaced a preselected distance from the second end 52 of the third and fourth sides 44 and 46. The first and second and third thrust sides 40, 42 and 70 and the second end 52 define a wedge guide passageway 72 therebetween. The third thrust side 70 is preferably a rectangular shaped block 74 having a guide surface 76 thereon. The guide surface 76 of the block 74 is oriented at a predetermined angle "A" relative to the longitudinal bearing support passage axis 49. Preferably this angle is in a range between 60 and 85 degrees.

The wedge 54 is slidably disposed in the wedge guide passageway 72 and guided by the first and second sides 40 and 42 and third thrust side 70 for movement relative thereto and relative to the bearing passage axis 49 and bearing 17 disposed therein. Specifically, the wedge second side 58 is at a predetermined angle "B" relative to the wedge first side 56 in the range of between 5 and 30 degrees. The factors influencing the decision as to what magnitude angle "A" and "B" should be will be discussed later.

The wedge 54 is oriented in the passageway 72 with its lower end portion 66 facing downwardly, the first side 56 thereof being in contact with the end surface portion 38 of guide bearing 17 and the second side 58 thereof being in contact with the guide surface 76 of the third thrust side 70. The wedge 54 is maintained in contact with these surfaces 38 and 76 due to a predetermined mass (weight) thereof.

It is to be noted that the wedge first side 56 is maintained normal to the bearing support passage longitudinal axis 49 due to the contact with surfaces 38 and 76.

The wedge 54 is guided by the passageway 72 so that first side 56 thereof moves in a direction toward the bearing end surface 38. Since the wedge second side 58 and the third thrust side 70 are at substantially the same angle relative to the longitudinal bearing support passage axis 49, movement of the wedge 54 in a direction toward its lower end portion 66 (downward) will result in movement of its first side 56 toward the bearing 17.

Movement of the wedge 54 downward causes movement of the bearing 17 along the passage axis 49 from the first position to the second position. The force of the wedge 54 acting on the bearing 17 for moving the bearing is the horizontal component of force acting along the longitudinal passage axis 49 and against surface 38. This force is determined by the mass of the wedge, the acceleration due to gravity the angle at which the sides 70 and 58 are at and the coefficient of friction therebetween.

The angle of the surfaces 76 and 58 and a coefficient of friction therebetween are of considerable importance. Since the force required to move the bearing 17 to the second position is small in comparison to the force applied to the bearing from the second member, due to operation thereof, the angles and the surface texture must be carefully determined.

Second end 52 functions as a stop surface against which wedge first side 56 abuts, for example when the bearing 17 is removed or when excessive wear of the bearing portion 36 takes place. In the latter condition the wedge first side 56 is free from contact with the bearing end surface portion 38 as the end surface portion 38 is now located between the first 50 and second end 52 of the support assembly 28. Further, second end 52 and third thrust side 70 will prevent movement of the wedge 54 in a direction toward its lower end portion and relative to the bearing 17 and third side 70 when the first and second sides 56 and 58 are in respective contact therewith.

A stop 78 is connected to the wedge 54 at its lower end portion 66 and extends past the first and second opposed surface 62 and 64 a preselected distance. The stop preferably is a roll pin 80 disposed in an aperature 82 in the lower end portion 66. The stop 78 is engageable with a lower end portion 84 of at least one of the first and second sides 40 and 42 and thus prevents inadvertent displacement or removal therefrom in an upward direction.

INDUSTRIAL APPLICABILITY

In operation and with reference to the drawings, the first member 18 is elevationally moved relative to the second member 20 upon which it is mounted to lift, for example, a load to an elevated position. In doing so, the load acting on the first member 18 will tend to cause cocking thereof relative to the second member 20. This cocking is due primarily to unequal distribution of the load on the first member and must be resisted otherwise inefficient operation of the lift mast will occur which will ultimately result in failure thereof. The self adjusting bearing arrangement 10 is provided to resist such cocking of the first member 18 and thereby improve operation and life of the lift mast 14.

During normal operation the cocking forces (side thrust forces) are transferred from the first member 18 to the second member 20 through the self adjusting bearing arrangement 10 without actually permitting cocking of the first member 18. This is possible due to the construction of the bearing arrangement as previously discussed.

In the event that the bearing portion should wear, due to a large magnitude of lift cycles and abusive loading, the wedge 54 will move downward in the wedge guide passageway 72 toward the bearing support passage axis 49 and toward the bearing end surface portion 38 and force the bearing 17 to move into contact with the second member 20. Thus the bearing 17 is automatically positioned to maintain continuous contact with the second member 20.

In the event that the side thrust loading is greater than the adjustment force applied to the bearing 17 the angle of the wedge second side 58 and the wedge guide third thrust side 70 and the friction therebetween will prevent movement of thewedge 54 in a direction away from the lower end portion 66 (upward) and thus maintain the bearing 17 at the second position.

In view of the foregoing, there is provided a self adjusting bearing arrangement for a pair of relatively movable members wherein an adjustment device 30 automatically applies a predetermined force to a bearing 17 to force the bearing to move to a contacting position with a second member and maintain the bearing at the contacting position.

Other aspects, objects and advantages of the invention can be obtained from a study of the drawings, disclosure and appended claims.

I claim:

1. A self adjusting bearing arrangement (10) for a pair of relatively movable members (12) comprising:
   bearing means (16) for guiding a first member (18) of said pair (12) for movement relative to a second member (20) of said pair (12), said second member (20) being an elongate upright having a longitudinal upright axis (25);
   carrier means (26) for connecting said bearing means (16) to the first member (18) of said pair (12) and guiding said bearing means (16) for movement between a first position at which said bearing means (16) is spaced from contact with the second member (20) and a second position at which said bearing means (16) is contactable with said second member (20),
   said carrier means (26) includes a support assembly (28) having a bearing support passage (48) disposed therethrough and being connected to said first member (18), said passage (48) having a longitudinal passage axis (49) and being oriented substantially normal to the longitudinal upright axis (25);
   said bearing means (16) includes a bearing (17) having a guide portion (34), a bearing portion (36) and a load surface portion (38), said guide portion (34) being slidably disposed in said passage (48) and movable relative to said passage (48) along said longitudinal passage axis (49) between said first position at which said bearing portion (36) is spaced from said second member (20) and said second position at which said bearing portion (36) is in contact with said second member (20); and
   adjustment means (30) for automatically applying a predetermined force to said bearing means (16) for moving said bearing means (16) to said second position and preventing movement of said bearing means (16) from said second position toward said first position, said adjustment means (30) includes a thrust member (32) having a predetermined weight, said thrust member (32) being mounted on said carrier means (26) adjacent said bearing (17) and contactable with said load surface portion (38), said thrust member being movable in response to and under the influence of its own weight and relative to the support assembly (28) and the bearing (17), said predetermined force being a function of said weight, said thrust member (32) includes a triangular shaped wedge (54) having first, second and third sides (56,58,60), and first and second opposed surfaces (62,64), said first side (56) being contactable with said bearing (17) load surface portion (38).

2. The self adjusting bearing arrangement (10) as set forth in claim 1 wherein said carrier means (26) further includes;
   a wedge guide portion (68) having said first and second parallel spaced apart sides (40,42) and a third thrust side (70) connected to said first and second parallel sides (40,42) and defining a wedge guide passageway (72) therebetween;
   said wedge (54) being disposed in said passageway (72) and said wedge second side (58) being slidably contactably engaged with the third side (70) of said passageway (72) and said first and second surfaces (62,64) of said wedge (54) being slidably guided by the first and second sides (40,42) respectively of said wedge guide portion (68).

3. The self adjusting bearing arrangement (10) as set forth in claim 2 wherein said wedge guide third side (70) is oriented at a preselected angle ("A") relative to the longitudinal bearing passage axis (49) to maintain the first side (56) of said wedge (54) substantially normal to said bearing passage axis (49) and in contact with the load surface portion (38) of said bearing (17).

4. The self adjusting bearing arrangement (10) as set forth in claim 3 wherein said wedge guide third side (70) is disposed at an angle of between 60 and 85 degrees with the longitudinal bearing passage axis (49).

5. The self adjusting bearing arrangement (10) as set forth in claim 3 wherein said wedge second side (58) is at an included angle of between 5 and 30 degrees relative to the wedge first side (56).

6. The self adjusting bearing arrangement (10) as set forth in claim 3 wherein said support assembly (28) has a second end (52), said second end (52) and said wedge guide third side (70) being spaced a preselected distance apart so that movement of said wedge (54) toward said bearing (17) and relative to said wedge guide third side (70) is prevented when said wedge first and second sides (56,58) are in contact with said second end (52) and said wedge guide third side (70) respectively.

7. The self adjusting bearing arrangement (10) as set forth in claim 3 wherein said wedge (54) has a lower end portion (66) and said thrust member (32) includes;
   a stop (78) connected to said wedge (54) at the lower end portion (66) thereon, said stop (78) extending past one of the first and second opposed surfaces (62,64) of said wedge (54) a preselected distance.

8. The self adjusting bearing arrangement (10) as set forth in claim 7 wherein said stop (78) is engageable with a lower end portion (84) of at least one of the first and second sides (40,42) of said wedge guide passageway (72) to maintain said wedge in said wedge guide passage (72) and prevent inadvertent displacement therefrom.

9. The self adjusting bearing arrangement (10) as set forth in claim 8 wherein said stop (78) includes a pin (80), said pin (80) being disposed in an aperature (82) in said wedge lower end portion (66).

10. The self adjusting bearing arrangement (10) as as forth in claim 1 wherein said support assembly (28) has a second end (52), said second end (52) being contactable with the first side (56) of said wedge (54) and maintains said wedge (54) from further movement in a direction toward said bearing (17).

11. The self adjusting bearing arrangement (10) of claim 1 wherein said bearing portion (36) consists of a non metallic plastic.

12. A self adjusting bearing arrangement (10) for a lift mast (14) having a carriage (18) and an upright (20) having a longitudinal axis (25), said carriage (18) being mounted on said upright (20) and elevationally movable along said upright (20); comprising:
   a support assembly (28) having a bearing support passage (48) disposed therethrough and a longitudinal passage axis (49) defined thereby, said support assembly (28) being mounted on said carriage (18) at a location adjacent said upright (20), and said passage axis (49) being oriented substantially normal to the longitudinal axis (25) of said upright (20);
   a bearing (17) having a guide portion (34) and a bearing portion (36), said guide portion (34) being disposed in the bearing support passage (48) and slidably guided thereby, said bearing (17) being movable in said bearing support passage (48) and along said passage axis (49) between a first position at which said bearing portion (36) is spaced a preselected distance from said upright (20) and a second position at which said bearing portion (36) is contactably engaged with said upright (20); and
   a triangular shaped wedge (54) having a first side (56) and being guidably supported on said carriage (18) at a location adjacent said bearing (17) and said support assembly (28), said wedge first side (56) being oriented substantially normal to the longitudinal passage axis (49) of said support assembly (28) and in contact with said bearing (17), said wedge (54) being movable, relative to the bearing (17) and support assembly (28) to move said bearing (17) to the second position and maintain said bearing (17) at said second position.

13. A self adjusting bearing arrangement (10) for movably guiding a first member (18) along a longitudinal axis (25) of a second member (20); comprising:
   a support assembly (28) having a bearing support passage (48) and a wedge guide passage (72), said bearing support passage (48) having a bearing support passage axis (49), said bearing support passage axis (49) being oriented substantially normal to the longitudinal axis (25) of said second member (20), said wedge guide passage (72) having a third thrust side (70), said third thrust (70) being oriented at a predetermined angle ("A") relative to the longitudinal bearing support passage axis (49);
   a bearing (17) being disposed in the bearing support passage (48) and slidably guided thereby, said bearing (17) being movable along said bearing support passage axis (49) between a first position at which said bearing (17) is spaced from said second member (20) and a second position at which said bearing (17) is contactably engaged with said second member (20); and
   a wedge (54) having a preselected weight, first and second sides (56,58) and being slidably disposed in said wedge guide passage (72), said wedge second side (58) being at a preselected angle ("B") relative to said wedge first side (56), said wedge first and second sides being engaged with the bearing (17) and the third thrust side (70), respectively, said wedge (54) being movable, under the influence of said weight, in said wedge guide passage (72) to forceably move said bearing (17) from the first position to the second position and maintain said bearing (17) at said second position.

* * * * *